(12) United States Patent
Lys (10) Patent No.: US 9,781,782 B2
(45) Date of Patent: Oct. 3, 2017

(54) ACTIVE CURRENT LIMITING FOR LIGHTING APPARATUS

(71) Applicant: Cree, Inc., Durham, NC (US)

(72) Inventor: Ihor Lys, La Jolla, CA (US)

(73) Assignee: Cree, Inc., Durham, NC (US)

( * ) Notice: Subject to any disclaimer, the term of this patent is extended or adjusted under 35 U.S.C. 154(b) by 860 days.

(21) Appl. No.: 13/624,268

(22) Filed: Sep. 21, 2012

(65) Prior Publication Data

US 2014/0084801 A1    Mar. 27, 2014

(51) Int. Cl.
     *H05B 33/08*    (2006.01)

(52) U.S. Cl.
     CPC ............................ *H05B 33/0812* (2013.01)

(58) Field of Classification Search
     USPC ........ 315/177, 185 R, 192, 200 R, 205, 224, 315/276, 279, 291, 297, 300, 302, 307, 315/311
See application file for complete search history.

(56) References Cited

U.S. PATENT DOCUMENTS

| | | | |
|---|---|---|---|
| 5,803,579 | A | 9/1998 | Turnbull et al. |
| 5,941,626 | A | 8/1999 | Yamuro |
| 7,088,059 | B2 | 8/2006 | McKinney et al. |
| 7,994,725 | B2 | 8/2011 | Bouchard |
| 2002/0097095 | A1 | 7/2002 | Jeon et al. |
| 2004/0046510 | A1 | 3/2004 | Allen |
| 2004/0245554 | A1 | 12/2004 | Oh et al. |
| 2005/0243630 | A1 | 11/2005 | Hsu et al. |
| 2007/0108843 | A1 | 5/2007 | Preston et al. |
| 2010/0060175 | A1 | 3/2010 | Lethellier |
| 2010/0231133 | A1 | 9/2010 | Lys |
| 2010/0308738 | A1 | 12/2010 | Shteynberg et al. |
| 2010/0308739 | A1 | 12/2010 | Shteynberg et al. |
| 2011/0025217 | A1 | 2/2011 | Zhan et al. |
| 2011/0068701 | A1 | 3/2011 | van de Ven et al. |
| 2011/0273102 | A1 | 11/2011 | van de Ven et al. |
| 2012/0026761 | A1 | 2/2012 | Young |
| 2012/0091920 | A1 | 4/2012 | Yang |
| 2012/0099321 | A1 | 4/2012 | Scott et al. |
| 2012/0126714 | A1* | 5/2012 | Deppe ................ H05B 33/0815 315/192 |

(Continued)

OTHER PUBLICATIONS

Mitter, C.S., "Active Inrush Current Limiting Using MOSFETs," Motorola, Inc., Motorola Semiconductor Application Note, AN 1542,1995, 14 pages.

(Continued)

*Primary Examiner* — Douglas W Owens
*Assistant Examiner* — Jianzi Chen
(74) *Attorney, Agent, or Firm* — Myers Bigel, P.A.

(57) ABSTRACT

A lighting apparatus, such as an LED lighting apparatus, includes at least one light-emitting device, a rectifier circuit having an input configured to be coupled to an AC source, and a driver circuit coupled to an output of the rectifier circuit and to the at least one light emitting device. The apparatus further includes an active current limiter circuit coupled to the output of the rectifier circuit and configured to limit a current provided to the driver circuit, such as a current drawn by an EMI filter of the driver circuit, which may cause erratic operation of a dimmer controlling the lighting apparatus.

24 Claims, 5 Drawing Sheets

(56) References Cited

U.S. PATENT DOCUMENTS

2012/0286696 A1* 11/2012 Ghanem ............ H05B 33/0815
　　　　　　　　　　　　　　　　　　　　　315/291
2013/0187572 A1*  7/2013 Grajcar ............. H05B 33/0824
　　　　　　　　　　　　　　　　　　　　　315/312
2014/0084801 A1   3/2014 Lys

OTHER PUBLICATIONS

Athalye, Praneet Jayant, "Solid-State Lighting Apparatus and Methods Using Energy Storage", U.S. Appl. No. 13/235,103, filed Sep. 16, 2011; 23 pages.
Ni, Liqin, "Solid-State Lighting Apparatus and Methods Using Current Diversion Controlled by Lighting Device Bias States", U.S. Appl. No. 13/235,127, filed Sep. 16, 2011; 23 pages.

\* cited by examiner

ACTIVE CURRENT LIMITING FOR LIGHTING APPARATUS

FIELD

The present inventive subject matter relates to lighting apparatus and methods and, more particularly, to solid-state lighting apparatus and methods.

BACKGROUND

Solid-state lighting arrays are used for a number of lighting applications. For example, solid-state lighting panels including arrays of solid-state light emitting devices have been used as direct illumination sources in architectural and/or accent lighting. A solid-state light emitting device may include, for example, a packaged light emitting device including one or more light emitting diodes (LEDs), which may include inorganic LEDs, which may include semiconductor layers forming p-n junctions and/or organic LEDs (OLEDs), which may include organic light emission layers.

Solid-state lighting devices are also used in lighting fixtures, such as incandescent bulb replacement applications, task lighting, recessed light fixtures and the like. For example, Cree, Inc. produces a variety of recessed downlights, such as the LR-6 and CR-6, which use LEDs for illumination. Solid-state lighting panels are also commonly used as backlights for small liquid crystal display (LCD) screens, such as LCD display screens used in portable electronic devices, and for larger displays, such as LCD television displays.

Some attempts at providing solid-state lighting sources have involved driving an LED or string or group of LEDs using a rectified voltage produced from an AC source. Examples of techniques for driving LEDs with a rectified AC waveform are described in U.S. Patent Application Publication No. 2010/0308738 and co-pending U.S. patent application Ser. No. 13/339,974, entitled "Solid-State Lighting Apparatus and Methods Using Parallel-Connected Segment Bypass Circuits," filed Dec. 29, 2011.

SUMMARY

Some embodiments provide a lighting apparatus including at least one light-emitting device, a rectifier circuit having an input configured to be coupled to an AC source, and a driver circuit coupled to an output of the rectifier circuit and to the at least one light emitting device. The apparatus further includes an active current limiter circuit coupled to the output of the rectifier circuit and configured to limit a current provided to the driver circuit.

In some embodiments, the active current limiter circuit may include a current sensor configured to generate a current sense signal responsive to the current. The active current limiter circuit may further include a normally-on transistor configured to control the current responsive to the current sense signal. The normally-on transistor may include a depletion-mode field-effect transistor (FET), and the current sensor may include a resistor coupled to gate and source terminals of the depletion-mode FET.

According to further embodiments, the driver circuit may include a filter. The active current limiter circuit may be configured to limit current drawn by the filter.

In additional embodiments of the inventive subject matter, an apparatus includes a rectifier circuit having an input configured to be coupled to a power source and an LED driver circuit having an input coupled to an output of the rectifier circuit and configured to drive at least one LED. The apparatus further includes an active current limiter circuit coupled to the output of the rectifier circuit and configured to limit current provided to the input of the LED driver circuit.

The active current limiter circuit may include a current sensor configured to generate a current sense signal responsive to a current output by the rectifier circuit and a transistor configured to operate responsive to the current sense signal. The transistor may include a depletion-mode FET and the current sensor may include a resistor coupled in series with the output of the rectifier circuit and the input of the LED driver circuit and to gate and source terminals of the depletion-mode FET. The LED driver circuit may include a filter and the active current limiter circuit may be configured to limit a current drawn by the filter.

Further embodiments provide an apparatus including a rectifier circuit having an input configured to be coupled to a power source and an LED driver circuit having an input coupled to an output of the rectifier circuit and configured to drive at least one LED. The apparatus further includes a depletion-mode FET coupled in series with the output of the rectifier circuit and a current sense resistor coupled in series with the output of the rectifier circuit and to gate and source terminals of the depletion-mode FET.

In additional embodiments, an apparatus includes a driver circuit configured to be coupled to a rectifier and to drive a lighting device and an active current limiter circuit configured to limit a current drawn from the rectifier by the driver circuit responsive to the current. The driver circuit may include a filter and the active current limiter circuit may be configured to limit a current drawn by the filter. The active current limiter circuit may include a normally-on transistor, such as a depletion-mode FET, and a current sensor coupled to the normally-on transistor.

Further embodiments provide methods of operating a lighting apparatus that include active current limiting a current output by an input rectifier of the lighting device. The lighting apparatus may include at least one LED and a driver circuit coupled to the input rectifier and configured to drive the at least one LED, and active current limiting of a current output by an input rectifier of the lighting device may include active current limiting of a current drawn by the driver circuit. The driver circuit may include a filter and active current limiting a current drawn by the driver circuit may include active current limiting of a current drawn by the filter. Active current limiting of a current output by an input rectifier of the lighting device may include controlling a depletion-mode FET current limiter circuit coupled in series with an output of the rectifier. The lighting apparatus may be powered by a dimmer.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be further understood that elements "coupled in series" or "serially connected" may be directly coupled or may be coupled via intervening elements.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device. The present inventive subject matter may further relate to an illuminated enclosure (the volume of which can be illuminated uniformly or non-uniformly), comprising an enclosed space and at least one lighting apparatus according to the present inventive subject matter, wherein the lighting apparatus illuminates at least a portion of the enclosed space (uniformly or non-uniformly).

Figure 1:
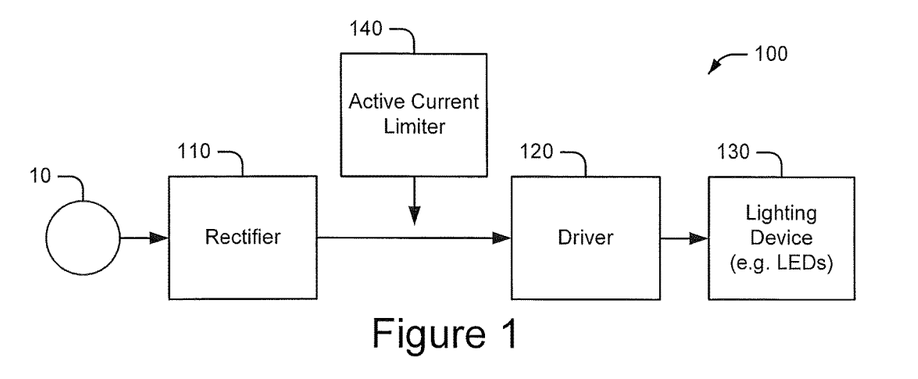
FIG. 1 illustrates a lighting apparatus with an active current limiter according to some embodiments.

FIG. 1 illustrates a lighting apparatus 100 according to some embodiments of the inventive subject matter. The apparatus 100 includes a rectifier 110, which is configured to be coupled to a power source 10. The power source 10 may include, for example, an AC power source or a dimmer-controlled power source, such as a source that produces a phase-cut AC signal using a triac or other switching device. The output of the rectifier 110 is coupled to the input of a driver circuit 120, which is configured to drive at least one lighting device 130, e.g., one or more LEDs. The driver circuit 120 may include, for example, a current source and/or other components that are used to drive an LED string, as well as other components, such as filters. Examples of driver circuits that may be used include circuits described in the aforementioned copending U.S. patent application Ser. No. 13/339,974, the disclosure of which is incorporated herein by reference in its entirety.

The apparatus 100 further includes an active current limiter circuit 140, which is configured to limit a current provided to the driver circuit 120. In some embodiments, the active current limiter circuit 140 operates in response to the current between the rectifier 110 and the driver circuit 120, such that the current is limited as it approaches a predetermined level. This can reduce or eliminate ringing and other undesirable effects that may arise from inrush currents associated with components of the driver circuit 120.

Figure 2:
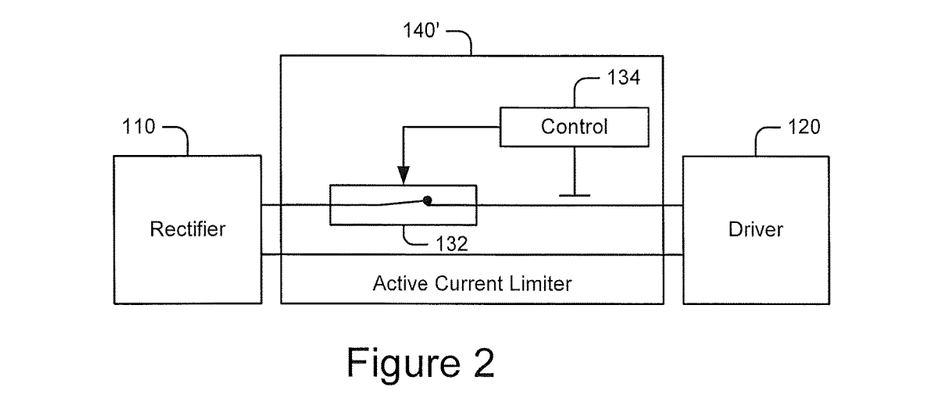
FIG. 2 illustrates a lighting apparatus with an active current limiter using a normally on transistor according to some embodiments.

FIG. 2 illustrates an implementation of an active current limiter circuit 140' according to further embodiments. The active current limiter circuit 140' includes a normally-on transistor 142, coupled in series with the output of a rectifier 110 and the input of a driver circuit 120. The transistor 142 may include, for example, a normally-on solid state device, such as a transistor. The transistor 142 is controlled by a control circuit 144, which is configured to sense a current between the rectifier 110 and the driver circuit 120 and to responsively control the transistor 142 such that, when the current exceeds a predetermined level, the current is limited. It will be appreciated that, although the active current limiter circuit 140' of FIG. 2 is shown as placed in an upper current path between the rectifier 110 and the driver circuit 120, a similar circuit may be placed in the lower path to similar effect.

Figure 3:
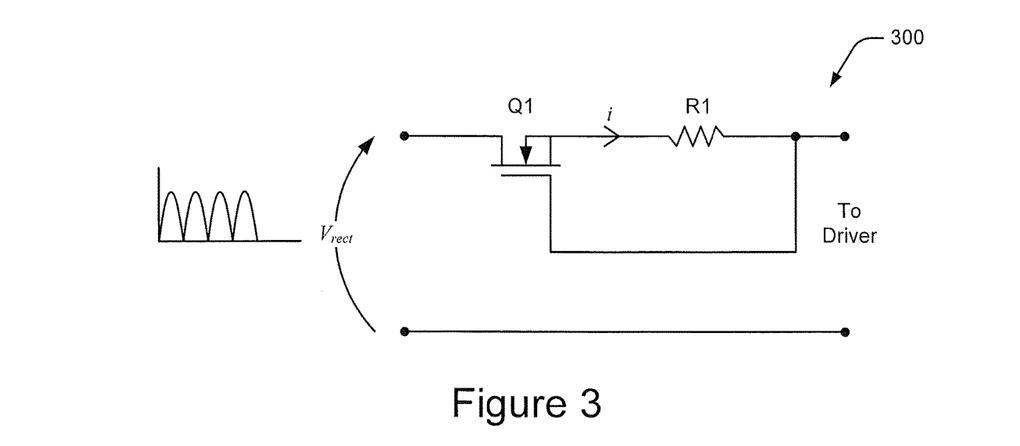
FIG. 3 illustrates an active current limiter according to further embodiments.

FIG. 3 illustrates an example of a current limiter circuit 300 according to further embodiments. The current limiter circuit 300 includes an n-channel depletion-mode MOSFET Q1 connected in series with a current sense resistor R1. The depletion-mode MOSFET Q1 acts as a normally-on transistor, i.e., its channel provides a low resistance when its gate to source voltage is low. As a rectified voltage $V_{rect}$ applied to the drain of the MOSFET Q1 increases, current flows i through the channel of the MOSFET Q1, causing a voltage to develop across the current sense resistor R1 and driving the gate voltage of the MOSFET Q1 below its source voltage. When the current i becomes sufficiently high, the channel of the MOSFET begins to pinch off, causing the current to be limited.

It will be appreciated that the circuit shown in FIG. 3 is offered for purposes of illustration, and that some embodiments may use other types of circuits. For example, although FIG. 3 illustrates use of an n-channel device, p-channel devices may be used in a similar manner. Enhancement-mode devices may be used in a similar fashion, but may require additional control circuitry to provide normally-on operation. Other types of transistors including BJT and other field effect and junction field effect types may also be used.

A particularly advantageous use for some embodiments of the invention is in lighting apparatus controlled by phase cut dimmers that use triacs or similar current-triggered devices. For example, typical phase-cut lighting dimmers traditionally used with incandescent lamps utilize triacs, which may not operate reliably when used with loads that may generate current ringing with the relatively abrupt voltage transitions produced by the phase cutting of the dimmer. Such current ringing may cause the triac to fire repeatedly, which may result in flickering and/or noise.

Figure 4:
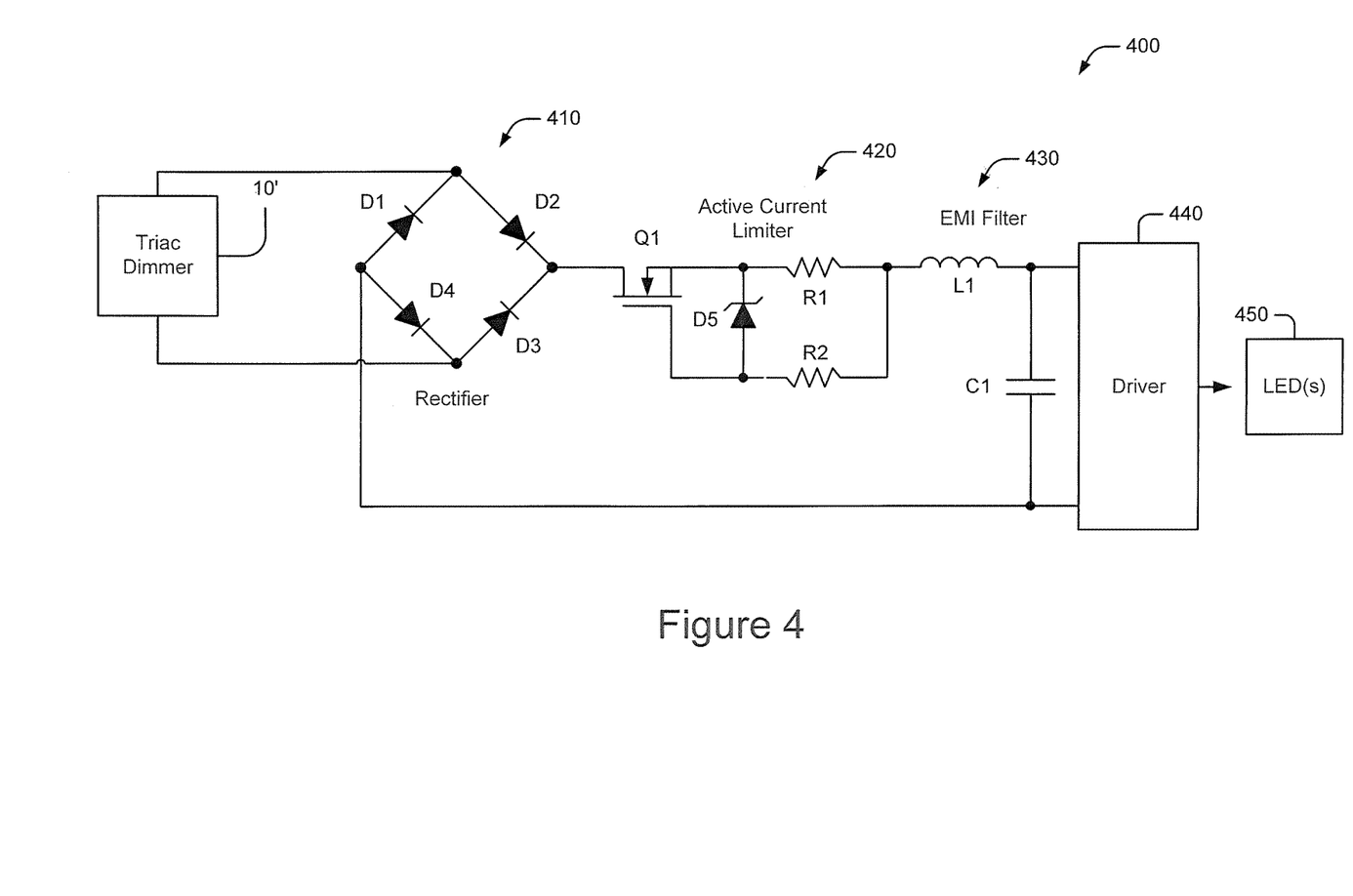
FIG. 4 illustrates a lighting apparatus according to some embodiments.

FIG. 4 illustrates an apparatus 400 according to further embodiments. The apparatus 400 includes a full-wave rectifier circuit 410 in the form of a diode bridge including diodes D1-D4. The input of the rectifier circuit 410 is connected to a triac dimmer 10', which supplies a variably phase-cut AC output. The output of the rectifier circuit 410 is coupled to an active current limiter circuit 420, which controls a current provided by the rectifier circuit 410 to a driver including an input electromagnetic interference (EMI) filter circuit 430 and a drive circuit 440, which is configured to drive one or more LEDs 450. The EMI filter circuit 430 includes an inductor L1 and a capacitor C1.

The active current limiter circuit 420 includes a depletion-mode MOSFET Q1, coupled in series with a current sense resistor R1. A zener diode D5 is coupled between the source and drain of the MOSFET Q1, and acts to limit the gate to source voltage. The current limiter circuit 420 also includes a diode current limiting resistor R2. The active current limiter circuit 420 may act to limit peak currents delivered to the filter circuit 430, and thus may reduce or prevent undesired triggering of the triac dimmer 10'. The active current limiter circuit 420 may thus reduce or prevent flicker and/or may reduce noise produced by the apparatus 400.

It will be appreciated that the embodiments illustrated in FIG. 4 are provided for purposes of illustration, and that some embodiments may be implemented in other ways. Components of the current limiter circuit 420 may be rearranged in relation to other components of the apparatus 400, e.g., the transistor Q1, resistors R1, R2 and diode D5 may be positioned between the inductor L and the capacitor C of the EMI filter 430. As noted above, similar functionality may be provided using a p-channel device connected in a complementary manner.

Embodiments of the inventive subject matter may be implemented in any of a variety of different forms, including, but not limited to lighting apparatus, such as lighting modules and fixtures, as well as control circuitry (e.g., integrated circuit devices, circuit modules and/or other devices) configured to be used in conjunction with LEDs and other circuit components in such lighting apparatus.

Figure 5:
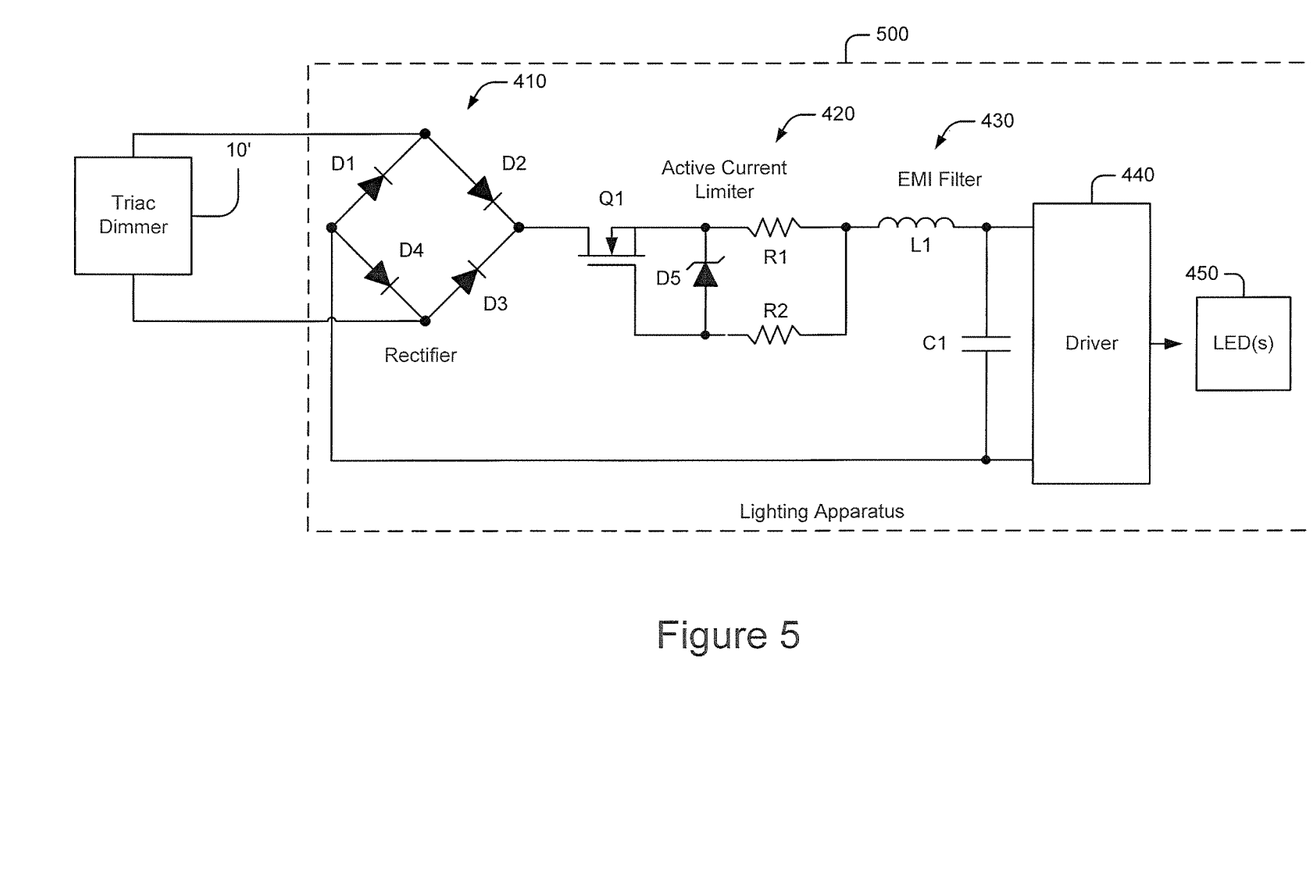
FIGS. 5 and 6 illustrate various arrangements of components of the lighting apparatus of FIG. 4 according to further embodiments.
Figure 6:
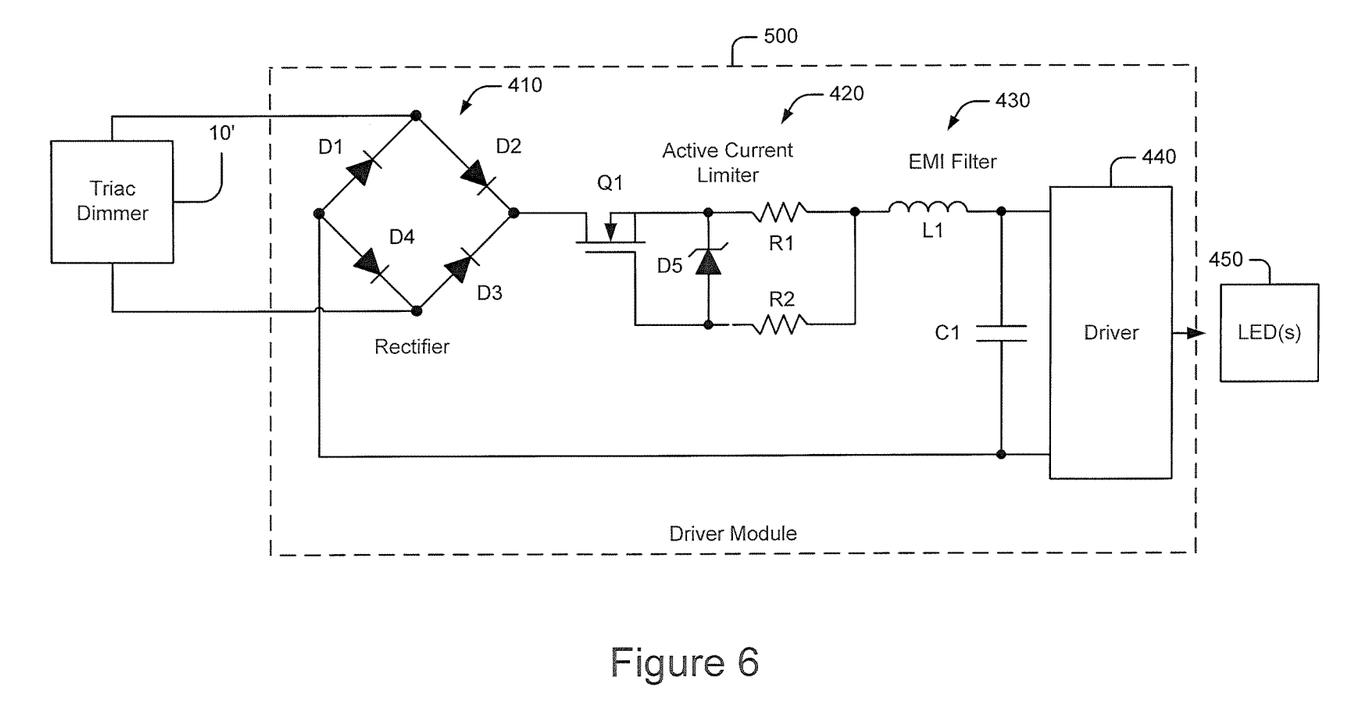

For example, FIG. 5 illustrates a lighting apparatus 500 including a rectifier circuit 410, an active current limiter circuit 420, an EMI filter 430, a drive circuit 440 and one or more LEDs, along the lines described above with reference to FIG. 4. These components may be integrated in a common assembly, for example, in a lighting fixture configured to be coupled to a triac dimmer 10'. Such a fixture may be an integrated assembly or may include, for example, one or more circuit boards, cards or other modules interconnected and supported by a common housing. As shown in FIG. 6, selected components of a lighting apparatus may be integrated in driver module 600, which may be configured to be coupled to a triac dimmer 10' or other AC source and to one or more LED's 450. It will be appreciated that some components of the driver module 600, such as the rectifier circuit 410, may be provided in a separate assembly or module, e.g., a single rectifier module may be connected to one or more driver modules, each of which may include a limiter circuit 420, an EMI circuit 430 and a drive circuit 440.

Figure 7:
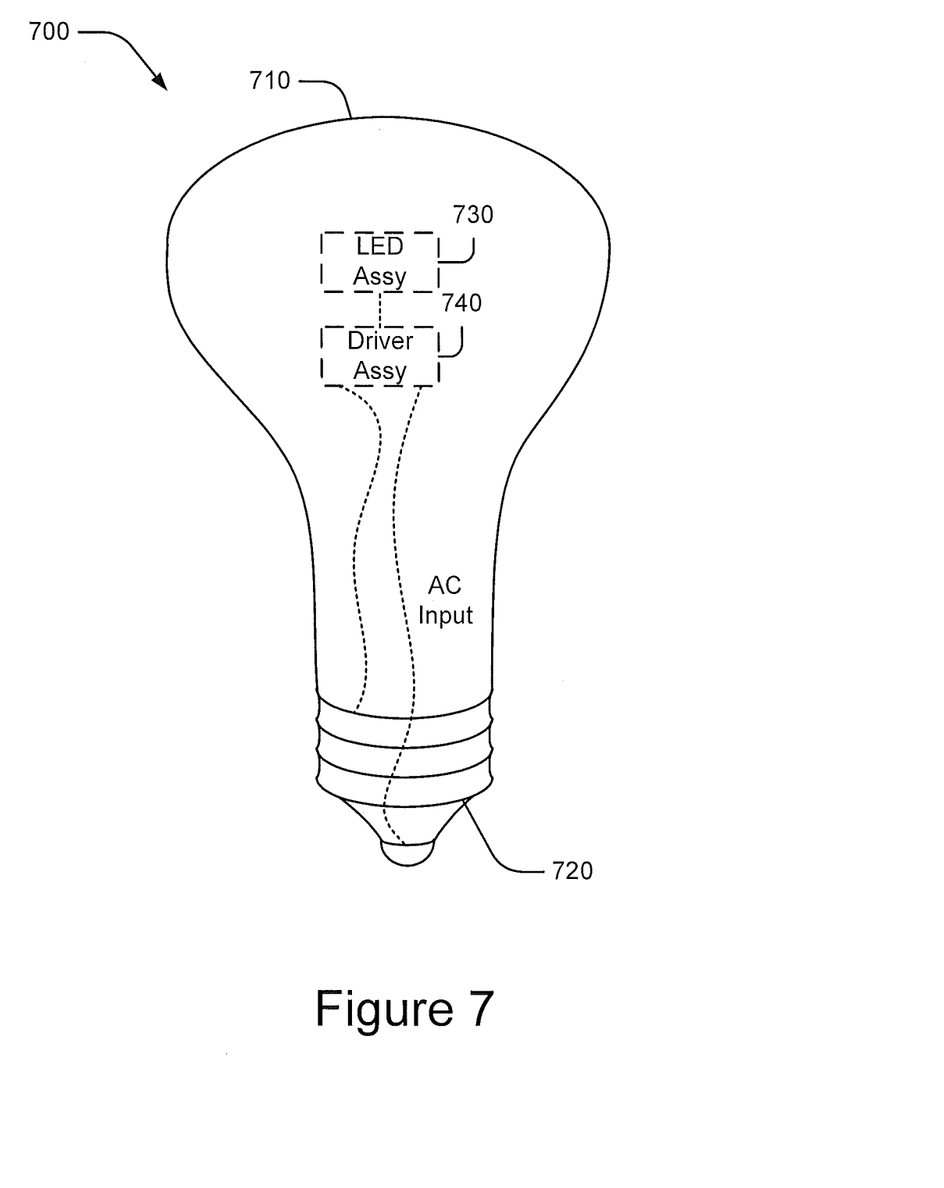
FIG. 7 illustrates a lamp assembly according to some embodiments.

As noted above, lighting apparatus according to some embodiments may be utilized in lighting fixtures, lamps and other assemblies. For example, FIG. 7 illustrates a lamp assembly 700 according to some embodiments. The lamp assembly 700 includes a transparent or semitransparent housing 710, inside of which are positioned an LED assembly 730 and a driver module 740, for example, a driver module along the lines discussed above with reference to FIG. 6. The driver module 740 is configured to receive AC power (e.g., from a triac dimmer) via a base connector 720 (e.g., an Edison base or other standard lighting base). It will be appreciated that the implementation of FIG. 7 is offered for purposes of illustration, and that embodiments of the inventive subject matter may be implemented in a number of other ways. For example, some embodiments may be implemented in integrated lighting fixtures, replacement kits for conventional lighting fixtures (e.g., can lights), or other types of lighting assemblies, fixtures, and systems.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

What is claimed is:

1. A lighting apparatus comprising:
   at least one light-emitting device;
   a rectifier circuit having two outputs and an input configured to be coupled to an AC source;
   a driver circuit electrically connected to the two outputs of the rectifier circuit and to the at least one light emitting device; and
   an active current limiter circuit coupled to and configured to conduct and limit a current between the rectifier circuit and the driver circuit,
   wherein the active current limiter circuit comprises:
      a current sensor configured to generate a current sense signal responsive to the current; and
      a depletion-mode field-effect transistor (FET) configured to control the current responsive to the current sense signal,
   wherein the depletion-mode FET has a drain electrically connected to an output of the two outputs of the rectifier circuit and a source electrically connected to a first circuit node of the apparatus,
   wherein the current sensor comprises a first resistor electrically connected between the first circuit node and an output node of the active current limiter circuit, the first resistor having a first terminal electrically connected to the first circuit node and a second terminal electrically connected to the output node of the active current limiter circuit,
   wherein the first resistor is configured to conduct a current between the first circuit node and the output node of the active current limiter circuit, and
   wherein the active current limiter circuit further comprises a second resistor electrically connected between a gate of the depletion-mode FET and the output node of the active current limiter circuit and configured to provide a voltage drop between the output node of the active current limiter circuit and the gate of the depletion-mode FET.

2. The apparatus of claim 1, wherein the driver circuit comprises a filter and wherein the active current limiter circuit is configured to limit current drawn by the filter.

3. The apparatus of claim 1, wherein the active current limiter circuit further comprises a zener diode electrically connected between the first circuit node and the gate of the depletion-mode FET, the zener diode having a cathode electrically connected to the first circuit node and an anode electrically connected to the gate of the depletion-mode FET, and wherein the zener diode is configured to provide a voltage drop between the first circuit node and the gate of the depletion-mode FET.

4. The apparatus of claim 1, wherein the depletion-mode FET has the drain directly coupled to the output of the rectifier circuit and the source directly coupled to the first circuit node of the apparatus.

5. An apparatus comprising:
   a rectifier circuit having two outputs and an input configured to be coupled to a power source;
   an LED driver circuit electrically connected to the two outputs of the rectifier circuit and configured to drive at least one LED; and
   an active current limiter circuit electrically connected to an output of the two outputs of the rectifier circuit and configured to conduct and limit current from the output of the rectifier circuit to the input of the LED driver circuit,
   wherein the active current limiter circuit comprises:
      a current sensor configured to generate a current sense signal responsive to a current output by the rectifier circuit; and
      a normally-on solid-state switch comprising a depletion-mode FET configured to operate responsive to the current sense signal,
   wherein the depletion-mode FET has a drain coupled to the output of the rectifier circuit and a source coupled to a first circuit node of the apparatus,
   wherein the current sensor comprises a first resistor electrically connected between the first circuit node and an output node of the active current limiter circuit, the first resistor having a first terminal electrically connected to the first circuit node and a second terminal electrically connected to the output node of the active current limiter circuit,
   wherein the first resistor is configured to conduct a current between the first circuit node and the output node of the active current limiter circuit, and
   wherein the active current limiter circuit further comprises:
      a second resistor electrically connected between a gate of the depletion-mode FET and the output node of the active current limiter circuit and configured to provide a voltage drop between the output node of the active current limiter circuit and the gate of the depletion-mode FET.

6. The apparatus of claim 5, wherein the current sensor comprises a resistor coupled in series with the output of the rectifier circuit and the input of the LED driver circuit and to gate and source terminals of the depletion-mode FET.

7. The apparatus of claim 5, wherein the LED driver circuit comprises a filter and wherein the active current limiter circuit is configured to limit a current drawn by the filter.

8. The apparatus of claim 5, wherein the active current limiter circuit further comprises a zener diode electrically connected between the first circuit node and the gate of the depletion-mode FET, the zener diode having a cathode electrically connected to the first circuit node and an anode electrically connected to the gate of the depletion-mode FET, and
   wherein the zener diode is configured to provide a voltage drop between the first circuit node and the gate of the depletion-mode FET.

9. The apparatus of claim 5, wherein the depletion-mode FET the drain directly coupled to the output of the rectifier circuit and the source directly coupled to the first circuit node of the apparatus.

10. An apparatus comprising:
 a rectifier circuit having two outputs and an input configured to be coupled to a power source;
 an LED driver circuit electrically connected to the two outputs and configured to drive at least one LED;
 a depletion-mode FET having a drain terminal electrically connected to an output of the two outputs of the rectifier circuit and a source electrically connected to a first circuit node of the apparatus;
 a current sense resistor that is electrically connected between the first circuit node and an input of the LED driver circuit and that is configured to conduct a current between the first circuit node and the input of the LED driver circuit; and
 a second resistor that is coupled in parallel with the current sense resistor, that is electrically connected between a gate of the depletion mode FET and an input of the LED driver circuit, and that is configured to provide a voltage drop between the input of the LED driver circuit and the gate of the depletion mode FET.

11. The apparatus of claim 10, wherein the LED driver circuit comprises a filter and wherein the depletion-mode FET and the current sense resistor are configured to limit a current drawn by the filter.

12. The apparatus of claim 10, further comprising a voltage limiter circuit configured to limit a gate-to-source voltage of the depletion-mode FET.

13. The apparatus of claim 10, wherein the depletion-mode FET has the drain terminal directly coupled to the output of the rectifier circuit and the source directly coupled to the first circuit node of the apparatus.

14. An apparatus comprising:
 a rectifier having two outputs and an input configured to be coupled to a power source;
 a driver circuit electrically connected to the two outputs of the rectifier and configured to drive a lighting device; and
 an active current limiter circuit that is electrically connected to an output of the two outputs of the rectifier and that is configured to conduct a current from the rectifier to the driver circuit and to limit the current responsive to the current,
 wherein the active current limiter circuit comprises:
  a normally-on solid-state switch comprising a depletion-mode FET; and
  a current sensor coupled to the normally-on solid-state switch,
 wherein the depletion-mode FET has a drain coupled to the output of the rectifier and a source electrically connected to a first circuit node of the apparatus,
 wherein the current sensor comprises a first resistor electrically connected between the first circuit node and an output node of the active current limiter circuit, the first resistor having a first terminal electrically connected to the first circuit node and a second terminal electrically connected to the output node of the active current limiter circuit,
 wherein the first resistor is configured to conduct a current between the first circuit node and the output node of the active current limiter circuit, and
 wherein the active current limiter circuit further comprises:
  a second resistor electrically connected between a gate of the depletion-mode FET and the output node of the active current limiter circuit and configured to provide a voltage drop between the output node of the active current limiter circuit and the gate of the depletion-mode FET.

15. The apparatus of claim 14, wherein the driver circuit comprises a filter and wherein the active current limiter circuit is configured to limit a current drawn by the filter.

16. The apparatus of claim 14, wherein the driver circuit is configured to drive at least one LED.

17. The apparatus of claim 14, wherein the active current limiter circuit is configured to limit a current between the rectifier circuit and the driver circuit responsive to the current between the rectifier circuit and the driver circuit.

18. The apparatus of claim 17, configured for use with a triac dimmer that provides power to the rectifier circuit.

19. The apparatus of claim 14, wherein the active current limiter circuit further comprises a zener diode electrically connected between the first circuit node and the gate of the depletion-mode FET, the zener diode having a cathode electrically connected to the first circuit node and an anode electrically connected to the gate of the depletion-mode FET, and
 wherein the zener diode is configured to provide a voltage drop between the first circuit node and the gate of the depletion-mode FET.

20. The apparatus of claim 14, wherein the depletion-mode FET has the drain directly coupled to the output of the rectifier and the source directly coupled to the first circuit node of the apparatus.

21. A method of operating a lighting device comprising at least one LED and a driver circuit configured to drive the at least one LED, the method comprising:
 active current limiting a current from an input rectifier of the lighting device to the driver circuit using an active current limiter circuit that conducts the current,
 wherein the input rectifier has two outputs and an input configured to be coupled to a power source,
 wherein the driver circuit is electrically connected to the two outputs of the input rectifier,
 wherein active current limiting a current from the input rectifier of the lighting device to the driver circuit using the active current limiter circuit that conducts the current comprises controlling the active current limiter circuit that comprises a current sense resistor, a second resistor coupled in parallel with the current sense resistor, and a depletion-mode FET having a drain electrically connected with an output of the two outputs of the input rectifier and having a source electrically connected to a first circuit node,
 wherein the current sense resistor is configured to conduct the current between the first circuit node and an output node of the active current limiter circuit, and
 wherein the second resistor is configured to provide a voltage drop between the output node of the active current limiter circuit and a gate of the depletion-mode FET.

22. The method of claim 21, wherein active current limiting the current from the input rectifier of the lighting device to the driver circuit using the active current limiter circuit that conducts the current comprises active current limiting a current drawn by the driver circuit.

23. The method of claim 22, wherein the driver circuit comprises a filter and wherein active current limiting the current drawn by the driver circuit comprises active current limiting a current drawn by the filter.

24. The method of claim 21, wherein the lighting apparatus is powered by a dimmer.

\* \* \* \* \*